July 11, 1944.　　　H. T. KRAFT　　　2,353,570
TIRE TREAD CONTRACTING DEVICE
Filed Jan. 22, 1943　　　2 Sheets-Sheet 1
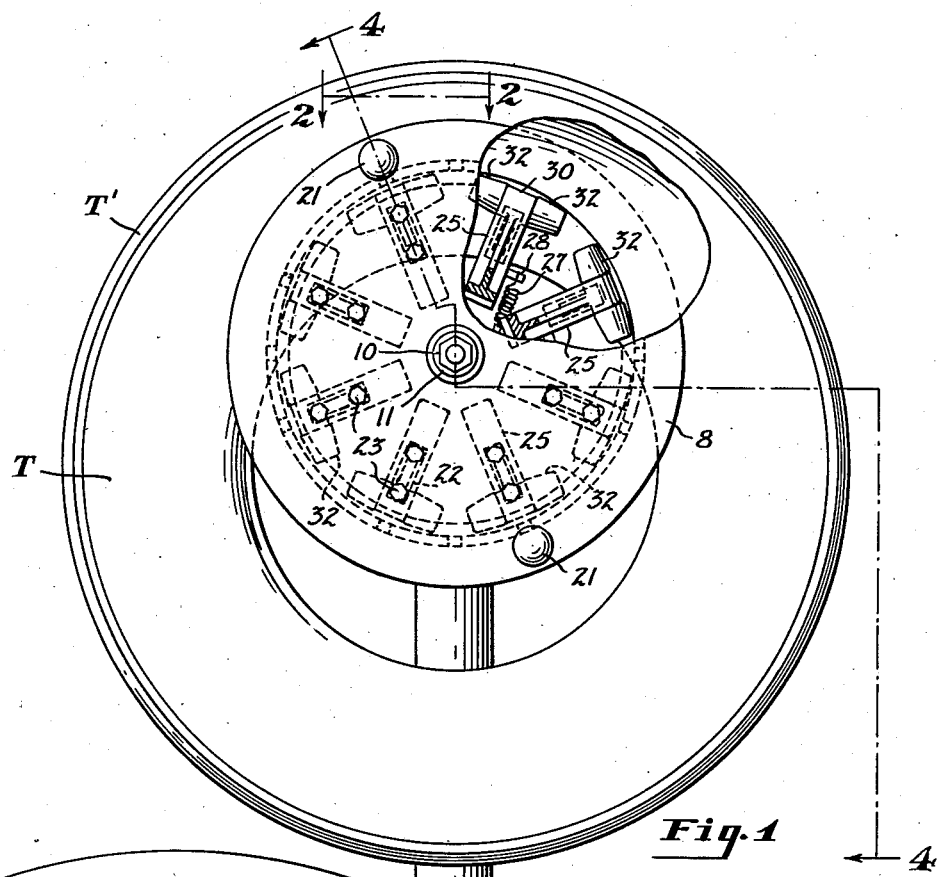
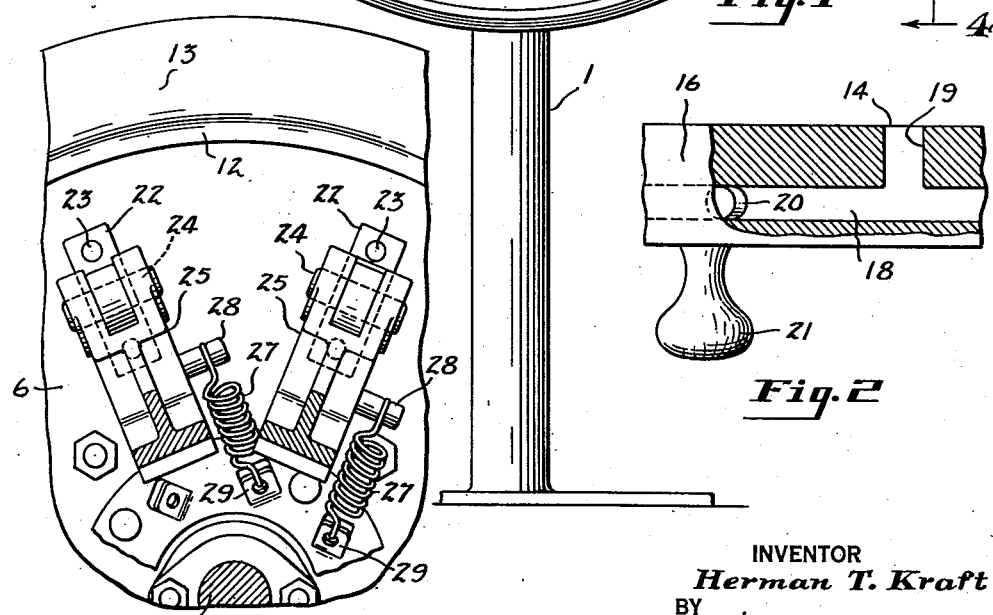
INVENTOR
*Herman T. Kraft*
BY
*Evans + McCoy*
ATTORNEYS July 11, 1944.  H. T. KRAFT  2,353,570
TIRE TREAD CONTRACTING DEVICE
Filed Jan. 22, 1943  2 Sheets-Sheet 2

INVENTOR
Herman T. Kraft
BY Evans + McCoy
ATTORNEYS

Patented July 11, 1944

2,353,570

UNITED STATES PATENT OFFICE 2,353,570

TIRE TREAD CONTRACTING DEVICE

Herman T. Kraft, Akron, Ohio, assignor to The General Tire & Rubber Company, Akron, Ohio, a corporation of Ohio Application January 22, 1943, Serial No. 473,219

14 Claims. (Cl. 18—2)

This invention relates to a tire tread contracting device for use in retreading tires which is adapted to shrink a tire casing to enable the casing to be placed within an endless vulcanizing ring after retread stock has been applied thereto.

The invention has for its object to provide a quick acting, simple and convenient mechanism for shrinking the tread of a tire casing to smaller diameter.

A further object of the invention is to provide a tread shrinking device which effects the shrinking of the tread without substantial distortion of the bead portions of the tire casing.

A further object of the invention is to provide a device which applies tension directly to the tire side walls to draw the tread inwardly in such manner that tension in the reinforcing cords of the tire is uniformly distributed so that stresses tending to cause or increase ply separation are not set up in the casing.

A further object of the invention is to provide a tire tread shrinking device which causes relatively slight distortion of the tread shoulders so that accurate centering of the tire in the ring mold is facilitated.

With the above and other objects in view, the invention may be said to comprise the device as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a front elevation of the tread shrinking device, a portion of the front disc being broken away and certain of the interior parts shown in section;

Fig. 2 is a fragmentary plan view showing a portion of the front tire bead engaging member, the view being taken as indicated by the arrows 2—2 in Fig. 1 and being partially broken away to show a part of the member in section;

Fig. 3 is a fragmentary sectional view taken on the broken line indicated at 3—3 in Fig. 4;

Figure 4:
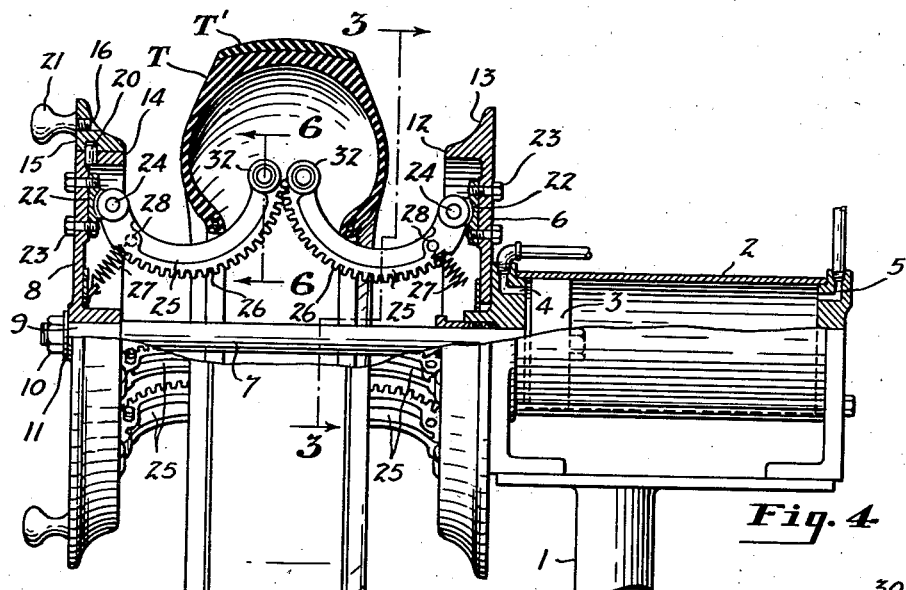
Fig. 4 is a sectional elevation taken as indicated by the broken line 4—4 in Fig. 1.
Figure 6:
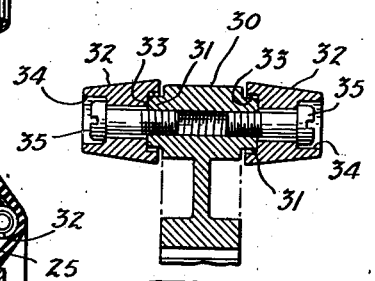
Fig. 6 is a section taken on the line indicated at 6—6 in Fig. 1.

Referring to the accompanying drawings, the tire tread shrinking device is shown mounted upon a supporting standard 1 upon the upper end of which is mounted a horizontally disposed fluid pressure cylinder 2, which has a piston 3 and front and rear ports 4 and 5 through which fluid may be introduced into or exhausted from the cylinder to actuate the piston. An annular disc 6 is attached to the front end of the cylinder 2 and is positioned coaxially with the cylinder. A piston rod 7 extends from the piston 3 through the head of the cylinder 2 and the disc 6 and an annular disc 8 is attached to the outer end of the piston rod 7. The disc 8 is attached to a reduced end portion 9 of the piston rod and is held in place by means of a nut 10 and washer 11. The discs 6 and 8 are of slightly greater diameter than the bead openings of the tire casing upon which the device is designed to operate and the inner disc 6 has a peripheral bead engaging portion 12 which projects inwardly and which has an inwardly slanting, tapering, bead engaging face 13. The disc 8 has an inwardly projecting peripheral flange 14 upon which is mounted a removable bead engaging ring 15 which has an inwardly slanting, tapering bead engaging face 16, which corresponds to the bead engaging face 13 of the inner disc, the flange 14 being small enough in diameter to pass through the central openings of the tire casing.

The ring 15 is detachably mounted in any suitable manner upon the disc 8. As herein shown, the flange 14 is provided with a circumferential slot 18 which connects with the transverse slot 19 extending to the outer face of the disc. The ring 15 has a pin 20 projecting radially from its interior face and adapted to enter the slots 19 and 18, the ring being provided with laterally projecting handles 21 by which it may be grasped and turned upon the flange 14. The ring 15 is inserted upon the flange 14 by aligning the pin 20 with the slots 19 and pushing the ring inwardly, and locked in place by turning the rings circumferentially after the pin 20 has been moved inwardly to the slot 18.

The slanting faces 13 and 16 at the peripheries of the discs 6 and 8 are adapted to exteriorly engage the beads of the tire casing to hold the beads against outward movement and to center the tire casing with respect to the discs as the discs 6 and 8 are drawn together by the piston 3. The bead portions of the tire casing are thus held between the discs 6 and 8 in substantially the position which they occupy when the tire is mounted on a rim and, while the beads are so held, means is provided for applying lateral outward pressure upon the interiors of the tire side walls substantially midway between the beads of the tire casing and the tread portion thereof, so as to apply tension to the side walls of the tire to draw the tread portion of the tire to a smaller diameter. The means for applying pressure interiorly to the casing walls is preferably actuated by the fluid pressure cylinder 2 and, as herein shown, comprises thrust applying members operatively connected to the discs 6 and 8 so as to be actuated by the discs during movement of the disc 8 toward the disc 6.

Figures 5, 7:
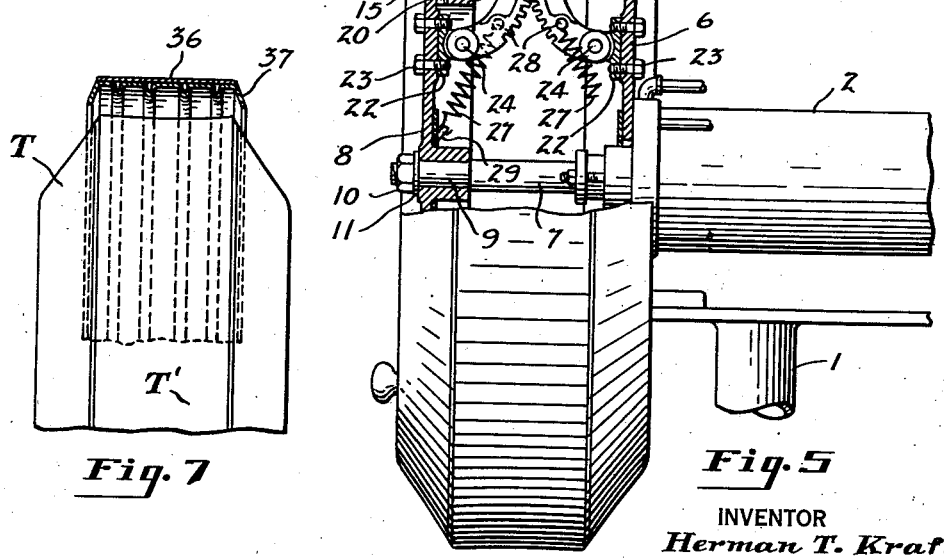
Fig. 5 is a view similar to Fig. 4, showing the parts in tread shrinking position.
Fig. 7 is a fragmentary sectional view showing a tread vulcanizing ring positioned around the contracted tread of a tire casing.

As shown in Figs. 3, 4 and 5, each of the discs 6 and 8 has a series of pivot brackets 22 secured to the discs by means of suitable attaching bolts 23, the brackets 22 being at equal distances from the axis of the discs and being spaced substantially uniformly circumferentially. Each of the brackets carries a pivot 24 disposed parallel to the plane of the disc and disposed substantially at right angles to radii centrally intersecting the pivots.

An arm 25 is pivotally connected at one end to each of the brackets 22, each arm being constrained by its pivot 24 to swinging movement in a radial plane. Each of the arms 25 is provided with a re-entrant or hollowed outer side which permits its outer or free end to swing outwardly past the vertical plane of its pivot without engaging with the inwardly projecting portions of the discs or with the beads of a tire casing seated on the peripheral portions of the discs. As herein shown, the arms 25 are of arcuate shape and are arranged in pairs with the circular faces of opposed arms in rolling engagement so that as the disc 8 moves toward the disc 6, the free ends of the arms 25 are caused to swing upwardly and outwardly against the side walls of a tire casing positioned between the discs. In order to insure that identical movements are imparted to the two arms of each pair, means is provided for preventing slippage between the engaging faces of the arms. As herein shown, the two arms are provided with intermeshing gear teeth 26, which cause the arms to roll upon each other without slippage. A spring 27 is attached to a pin 28 on each arm 25 and to a lug 29 on the disc to which the arm is attached adjacent the center thereof. The springs 27 serve to yieldingly hold the arms 25 in intermeshing engagement, to prevent disengagement of the arms during the opening and closing movements of the discs, and to return the disc 8 to its outermost position when the pressure in the forward end of the cylinder 2 is released.

Each of the arms 25 has a rounded free end portion 30 which has axially aligned, laterally projecting, cylindrical bosses 31 which serve to position tapered rollers 32 which engage with the tire side walls. The rollers 32 have recesses 33 at their inner ends to receive the bosses 31 and recesses 34 at their outer ends to receive the heads of bolts 35 which are threaded into the end portion 30 and serve as shafts for the rollers 32.

In the operation of the device, the discs 6 and 8 are separated as shown in Fig. 4 by exhausting fluid through the port 4 and admitting fluid through the rear portion 5 of the cylinder and the tire casing may then be positioned between the discs as shown in Fig. 4 by first removing the ring 15 and slipping the tire over the periphery of the disc 8. The ring 15 may then be replaced upon the disc 8 after which the disc 8 may be moved toward the disc 6 by admitting fluid pressure into the cylinder through the port 4. The tire is initially supported upon the uppermost of the arms 25, as shown in Figs. 1 and 4. Upon movement of the disc 8 toward the disc 6 the arms 25 swing radially outwardly and as the peripheral portions of the discs approach the tire, the tire may be lifted by hand to a position such that the inwardly projecting bead engaging portions at the periphery of the discs will enter the central opening of the tire. Further movements of the disc 8 toward the disc 6 will cause the bead portions of the tire to ride up the inclines 13 and 16 to center the tire with respect to the discs.

Substantially simultaneously with the engagement of the discs with the bead portions of the tire, the free end portions 30 of the arms 25 will engage with the interiors of the tire side walls and continued movement of the disc 8 will cause the ends of the two arms to move axially in opposite directions to expand the tire side walls. The tension thus applied to the side walls reduces the internal curvature of the tread portion of the tire and draws the tread portion inwardly to a smaller diameter, so that a mold ring 36 may be inserted over the tread when the tire is permitted to expand.

As illustrated in Fig. 4, the tire T is shown with a tread T' of unvulcanized rubber stock and this tire is shrunk to a diameter small enough to pass within the side flanges 37 of the ring mold 36. When the ring mold is positioned around the tread of the tire, the pressure in the cylinder 2 may be released to thereby release the pressure on the disc 8 so that the tire may expand as the disc 8 moves away from the disc 6.

The device of the present invention shrinks the tread of the tire with a minimum of distortion of the tread shoulders, so that the ring mold 36 readily centers itself with respect to the tire as the tire is expanded. The application of tension to the side walls of the tire by pressure applied interiorly of the side walls is advantageous since the tension is thus distributed substantially uniformly to the reinforcing cords within the tire carcass and stresses which might tend to cause ply separation or to increase such separation are avoided. Also, it should be noted that the tire beads are held throughout the tread shrinking operation in substantially the position in which they were originally vulcanized and which they occupy in service, so that excessive stresses in the bead portions of the tire casing are avoided.

It is apparent that the device of the present invention provides a very simple and rapidly operating device for applying a ring mold to a tire casing and that this operation is performed in such a way as to avoid damage to the tire casing.

It is to be understood that variations and modifications of the specific device herein shown and described for purposes of illustration may be made without departing from the spirit of the invention.

What I claim is:

1. A tire tread contracting mechanism comprising a pair of annular bead restraining members adapted to exteriorly engage the beads of a tire, side wall spreading members engageable with the interior of each side wall of the tire, and means for moving the bead restraining members, one toward the other to move the beads of a tire nearer together, and for simultaneously actuating the side wall spreading members in an outward direction to spread the side walls of the tire.

2. A tire tread contracting mechanism comprising means for restraining spreading movements of the beads of a tire, members for interiorly engaging each side wall of the tire at a series of points spaced circumferentially thereof, and means for actuating said members to spread the side walls of the tire.

3. A tire tread contracting mechanism comprising members for exteriorly engaging the tire beads, members for interiorly engaging each tire side wall, and means for simultaneously actuating said members to move the beads one toward the other and to spread the tire side walls.

4. A tire tread contracting mechanism comprising members for exteriorly engaging the tire beads, members for interiorly engaging each tire side wall, means operably connecting the tire wall engaging members to the tire bead engaging members to impart movement to a tire wall engaging member in a direction opposite that in which the member engaging the adjacent bead is moved, and means for moving the tire bead engaging members, one toward the other.

5. A tire bead contracting mechanism comprising a pair of coaxial annular members adapted to exteriorly engage the beads of a tire, a fluid pressure cylinder having a piston coaxial with said annular members, said cylinder being attached to one of said members and said piston being attached to the other, members engageable with the interior of each side wall of the tire, and means operably connecting the side wall engaging members with the bead engaging members to move the members engaging the interior of each side wall in opposite axial directions when the bead engaging members are moved relatively by the cylinder and piston.

6. A tire bead contracting mechanism comprising a pair of coaxial annular members adapted to exteriorly engage the beads of a tire, means for moving said members, one toward the other, arcuate arms pivoted upon the interior of each of said members to swing radially, said arms being arranged in pairs with their convex sides facing toward the axis of said members, means operatively connecting said arms for simultaneous outward movement, and thrust members carried by the free ends of said arms and engageable with the side walls of a tire interiorly thereof.

7. A tire bead contracting mechanism comprising a pair of coaxial annular members adapted to exteriorly engage the beads of a tire, means for moving said members, one toward and away from the other, arcuate arms pivoted upon the interior of each of said members to swing radially, said arms being arranged in pairs with their convex sides facing toward the axis of said members, and intermeshing gear teeth on the convex sides of said arms, the free ends of said arms being engageable interiorly with the side wall of a tire.

8. A tire thread contracting mechanism comprising a pair of coaxial annular members having peripheral portions adapted to exteriorly engage the beads of a tire, said peripheral bead engaging portions being oppositely tapered so as to center the tire when the members are moved one toward the other against the tire beads, members carried by said annular members and engageable with the tire side walls interiorly thereof, and means operatively connecting said last named members to move said tire wall engaging members outwardly to spread the side walls when said annular members are moved inwardly against the tire beads.

9. A tire tread contracting mechanism comprising a pair of coaxial annular members having peripheral portions adapted to exteriorly engage the beads of a tire, the peripheral portion of one of said annular members being removable to permit a tire to be passed over the member, members carried by said annular members and engageable with the tire side walls interiorly thereof, and means for operatively connecting said members and moving the tire wall engaging members outwardly to spread the side walls when said annular members are moved inwardly against the tire beads.

10. A tire tread contracting mechanism comprising a pair of coaxial annular members having peripheral portions adapted to exteriorly engage the beads of a tire, said peripheral bead engaging portions being oppositely tapered so as to center the tire when the members are moved one toward the other against the tire beads, and arcuate intermeshing gear segments pivoted to the inner faces of annular members, the free ends of said segments being engageable interiorly with the side walls of a tire.

11. A tire tread contracting mechanism comprising a pair of coaxial annular members having peripheral portions adapted to exteriorly engage the beads of a tire, said peripheral bead engaging portions being oppositely tapered so as to center the tire when the members are moved one toward the other against the tire beads, and pairs of arcuate gear segments spaced circumferentially of said annular members, the segments of each pair being intermeshed and pivoted to the inner faces of the annular members to swing radially, the free ends of said segments being engageable interiorly with the side walls of a tire.

12. A tire tread contracting mechanism comprising a pair of coaxial annular members having peripheral portions adapted to exteriorly engage the beads of a tire, said peripheral bead engaging portions being oppositely tapered so as to center the tire when the members are moved one toward the other against the tire beads, pairs of arcuate gear segments spaced circumferentially of said annular members, the segments of each pair being intermeshed and pivoted to the inner faces of the annular members to swing radially, the free ends of said segments being engageable interiorly with the side walls of a tire, and springs acting on said segments to resist outward swinging movements thereof.

13. A tire tread contracting mechanism comprising a pair of coaxial annular members having peripheral portions adapted to exteriorly engage the beads of a tire, a series of arms pivoted to the inner face of each annular member at points spaced circumferentially of the member to swing radially, the outer side of each arm being re-entrant and the free ends of each arm being engageable with a side wall of the tire interiorly thereof, and means for moving the annular members one toward the other and for simultaneously swinging said arms outwardly.

14. A tire tread contracting mechanism comprising a pair of coaxial annular members having peripheral portions adapted to exteriorly engage the beads of a tire, a series of arms pivoted to the inner face of each annular member at points spaced circumferentially of the member to swing radially, the outer side of each arm being reentrant and the free ends of each arm being engageable with a side wall of the tire interiorly thereof, means for moving the annular members one toward the other and for simultaneously swinging said arms outwardly, and tapering laterally projecting rollers carried by the free ends of said arms.

HERMAN T. KRAFT.